Aug. 25, 1970     W. L. LINN     3,525,888

MAGNETIC UNIDIRECTIONAL SYSTEM FOR A MOTOR

Original Filed Aug. 11, 1967

INVENTOR
WALLACE L. LINN
BY
ATTORNEY

United States Patent Office 3,525,888
Patented Aug. 25, 1970

1

3,525,888
MAGNETIC UNIDIRECTIONAL SYSTEM FOR A MOTOR
Wallace L. Linn, Indianapolis, Ind., assignor to P. R. Mallory & Co., Inc., Indianapolis, Ind., a corporation of Delaware
Continuation of application Ser. No. 660,090, Aug. 11, 1967. This application Oct. 27, 1969, Ser. No. 869,945
Int. Cl. H02k 7/10
U.S. Cl. 310—41                                    3 Claims

ABSTRACT OF THE DISCLOSURE

A magnetic directional drive control means is used to prevent rotation of a rotor of a synchronous motor in one direction while permitting rotation of the rotor in another or predetermined direction so that the motor may attain operating conditions with the least possible delay. The magnetic directional drive control means disengages the rotor of the motor when the rotor is displaced in a predetermined direction thereby substantially eliminating friction losses normally associated with drive control means which remain partially engaged with the rotor.

---

Figure 1:
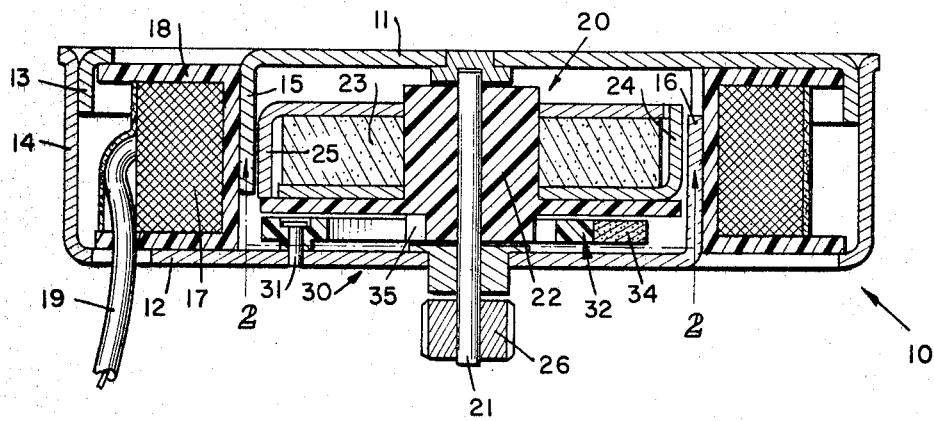

This case is a continuation of Ser. No. 660,090, filed Aug. 11, 1967, now abandoned.

The present invention relates generally to self-starting synchronous motors, and more particularly to synchronous motors with directional drive control means.

A multitude of applications for synchronous motors of the type using a permanent magnet rotor are known. Some of the applications for synchronous motors are as a drive means for timing devices such as electric clocks and the like, a drive means for sequence timers such as the type used with washing machines, dishwashers, dryers and the like.

Self-starting synchronous motors may start and run in either of two directions unless the motor is provided with a directional drive control means which permits the rotor to rotate in one direction and prevents rotation in the other or reverse direction. Generally speaking, asymmetry of the magnetic circuit of the motor is the primary cause of the rotor rotating in either of two directions. Thus it is seen that under one set of conditions the rotor will rotate in one direction while under another set of conditions the rotor will rotate in the reverse direction. Several of the prior art drive control means are of the type which permit the rotor of the motor to be displaced initially in either of two directions; however, the drive control means will cause the rotor to reverse or rebound so as to rotate in the desired or the predetermined direction after displacement of the rotor in the undesired or reverse direction. Several of the prior art synchronous motors have a control device which may include bias means, ratchets and the like for controlling the direction of rotation of the rotor of the synchronous motor. While several of the prior art drive control means are satisfactory for their intended purpose, they are, however, deficient in other respects. For example, several of the prior art drive control means are subject to rapid wear and/or unusual noise and/or continue to be engaged with the rotor even during displacement of the rotor in the predetermined direction thereby resulting in unnecessary and undesirable frictional losses. The frictional losses may require the use of a synchronous motor having a higher rated torque output than would normally be required to provide the torque output necessary to drive a device such as a sequence timer. The directional control means of the present invention completely disengages the rotor of the synchronous motor when the rotor initiates rotation in a predetermined direction thereby substantially eliminating undesirable frictional losses associated with several presently available directional control means.

Therefore, it is an object of the present invention to provide a magnetic directional control means for a self-starting synchronous motor that will engage with and prevent rotation of the rotor if the rotor initiates rotation in the reverse direction but that will disengage the rotor when the rotor initiates rotation in a predetermined direction.

Another object of the present invention is to provide a directional drive control means for self-starting synchronous motors which permits more efficient and effective use of the torque of the motor by substantially eliminating frictional losses usually associated with several of the presently available directional drive control means.

A further object of the present invention is to provide a magnetic directional drive control means for self-starting synchronous motors that is engaged with the rotor when the rotor initiates rotation in a reverse direction thereby preventing further rotation of the rotor in the reverse direction and that is disengaged from the rotor when the rotor initiates rotation in a determined direction thereby allowing continued rotation of the rotor in the determined direction.

Another object of the present invention is to provide a magnetic directional drive control means for self-starting synchronous motors which is in expensive, effective, efficient, durable and substantially noise-free.

Still another object of the present invention is to provide a magnetic drive control means having optimum reliability characteristics afforded by a compact construction having a minimum number of parts.

Yet another object of the present invention is to provide a magnetic directional drive control means for self-starting synchronous motors wherein the combination is usable in shallow-depth locations.

The present invention, in another of its aspects, relates to the novel features of the instrumentalities of the invention described herein for teaching the principal objects of the invention and to the novel principles employed in the instrumentalities whether or not these features and principles may be used in the said objects and/or in the said field.

With the aforementioned objects enumerated, other objects will be apparent to those persons possessing ordinary skill in the art. Other objects will appear in the following description, appended claims, and appended drawings.

The invention resides in the novel construction, combination, arrangement and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

Figure 2:
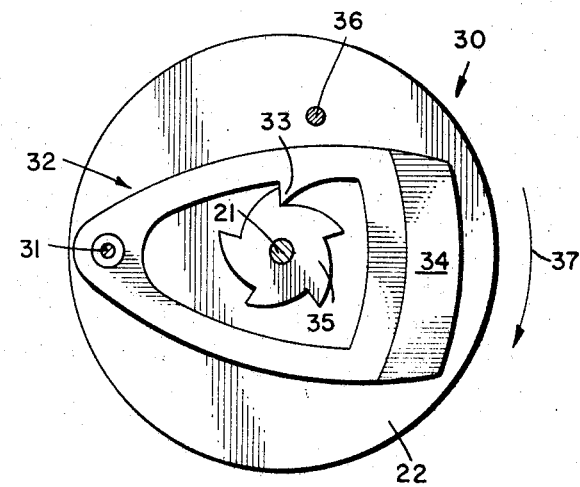
Figure 3:
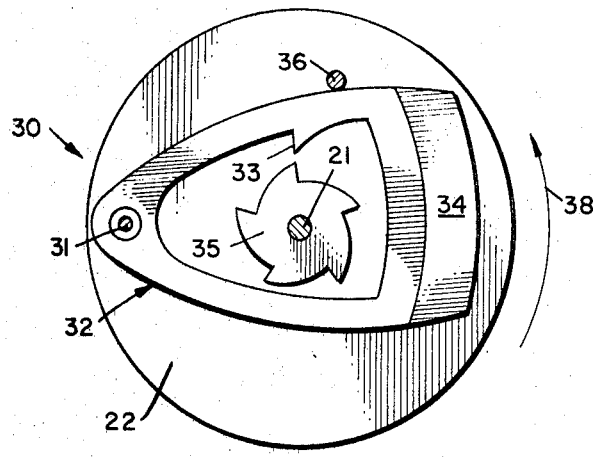

In the drawing:

FIG. 1 is a cross-sectional view of a typical self-starting synchronous motor utilizing a magnetic directional drive control means;

FIG. 2 is an end view of the magnetic directional drive control means taken across the line 2—2 of FIG. 1, showing the magnetic drive control means engaged with a ratchet carried by the rotor of the self-starting synchronous motor; and FIG. 3 is an end view of the magnetic directional drive control means taken across the line 2—2 of FIG. 1 showing the magnetic directional drive control means disengaged from the ratchet of the rotor of the synchronous motor thereby permitting the synchronous motor to rotate in a predetermined direction under a no load condition.

Generally speaking, the means and methods of the present invention relate to a magnetic directional drive control means for allowing rotation of a rotor of a synchronous motor in one direction only. The magnetic directional drive control means includes several components such as a substantially triangular-shaped pawl, a permanent magnet means, a stop means and a ratchet wheel. The substantially triangular-shaped pawl has an extremity pivotally coupled to the housing of the motor and a pawl tooth integrally formed with a side of the triangular-shaped pawl. The permanent magnet means is carried by the triangular-shaped pawl and includes a pole face adjacent a pole face of the permanent magnet rotor and opposite in polarity to the polarity of the adjacent pole face of the rotor so that the permanent magnet carried by the triangular-shaped pawl is urged in the direction of the displacement of the rotor. The stop means is formed in the housing and is in an interference path with a side of the triangular-shaped pawl. The ratchet wheel is carried by the rotor and is displaceable therewith. Displacement of the rotor in one direction causes the tooth of the triangular-shaped pawl to engage with the ratchet wheel thereby preventing further rotation of the rotor in that direction. Displacement of the rotor in another direction causes the triangular-shaped pawl to pivot out of engagement with the ratchet wheel thereby allowing further displacement of the rotor in the other direction with the magnetic drive control means exerting no load on the rotor.

It will be recognized that the specific structure of the self-starting synchronous motor may be any one of several presently available forms without departing from the novel concepts of the present invention. However, the following description of a particular type of synchronous motor is given in the interest of a clearer showing of the inventive aspects of the present invention.

Referring now to FIG. 1, a self-starting synchronous motor is indicated by the reference numeral 10. The self-starting synchronous motor includes upper end plate 11 and lower end plate 12 in the form of an annular disc fabricated from any suitably magnetic material, such as cold rolled steel or the like. The end plates 11 and 12 each include an outer rim 13 and 14 respectively. As shown in FIG. 1, a portion of the outer rim of each of the end plates inter-fit each with the other so as to provide a suitable housing for the synchronous motor. A plurality of stator poles 15 and 16 are stamped in radial fashion respectively from the end plates 11 and 12 so as to be at substantially a right angle with the end plates 11 and 12. The stator poles of the end plates are so stamped that when the end plates are fitted together, as shown in FIG. 1, the stator poles of plate 11 are interleaved with the stator poles of plate 12 so that adjacent poles have an opposite polarity.

A coil 17 is wound on an axially apertured bobbin 18. The coil 17 includes a lead means 19 coupled to any suitable AC source (not shown). As shown in FIG. 1, the side walls forming the aperture of the bobbin engage with the stator poles 15 and 16 thereby retaining the coil in a determined position within said housing. The bobbin 18 may be fabricated from any suitable plastic material such as a thermoplastic material.

Journalled between the end plates 11 and 12 and positioned between diagonally opposite stator plates is rotor means 20 of the synchronous motor. The rotor means includes an output shaft 21, hub means 22, an apertured cylindrical-shaped permanent magnet 23 and rotor poles 24 and 25 radially extending from the hub means. It should be noted that the rotor poles are in spaced parallel relationship with respect to the stator poles. The shaft carries hub means 22 which is fixedly connected thereto by any suitable means such as by press fitting and the like. The hub means is fabricated from any suitable electrically insulative plastic material such as a thermoplastic material or the like. The permanent magnet means 23 is fixedly connected to the hub means and is fabricated from any suitable hard ferrite material. The lowermost surface of the permanent magnet includes a pole face of one polarity while the uppermost surface of the permanent magnet includes a pole face of opposite polarity. A plurality of rotor poles 25 include a portion overlying the uppermost surface of the permanent magnet means and assume the polarity of the uppermost surface. A plurality of rotor poles 24 include a portion underlying the lowermost surface of the permanent magnet means and assume the polarity of the lowermost surface of the magnet. The rotor poles 25 and 24 are interleaved so that adjacent rotor pole faces have an opposite polarity. The rotor poles are fabricated from any suitable magnetic soft material such as cold rolled steel or the like.

A ratchet wheel means 35 is integrally molded with the hub means and is, therefore rotatably displaced with the rotor means as the rotor is displaced.

The output shaft 21 has fixedly connected thereto a pinion 26 which is used to apply the energy output of the motor to a means to be driven such as a sequential timer and the like.

End plate 12 carries a magnetic directional drive control means 30. A post 31 projecting outwardly from the stator plate 12 serves as a pivot point for a substantially triangular-shaped pawl means 32. The pawl means 32 includes a pawl tooth 33 and a permanent magnet 34 fixedly connected to a side of the pawl means. The uppermost surface of the magnet 34 is of one polarity while the lowermost surface of the magnet is of another polarity. Stop post means 36 projects outwardly from end plate 12 and is in an interference path with the pawl means of the directional drive control means to thereby limit the arcuate displacement of the pawl arm in the counterclockwise direction.

With the hereinbefore structural disclosure in mind, and by continued reference to the several figures of the drawing, the following analysis of the operation of the present invention will serve further to amplify the novelty of the magnetic directional drive control means.

The current flowing through the coil 17 causes a magnetic flux to flow through the stator poles inducing a north or a south pole on the particular stator pole depending on the polarity of the half-cycle alternating current wave flowing in the coil at any particular instant of time. Since the stator poles are interleaved as described hereinbefore, adjacent stator poles assume an opposite polarity. The interaction of the magnetic force present in the motor causes the rotor to be displaced in either the clockwise or the counterclockwise direction. Assuming that the rotor is displaced in the direction of arrow 37, or the clockwise direction, the clockwise direction of rotation of the permanent magnet of the rotor causes a clockwise displacement of the perment magnet carried by the pawl means 32 of the magnetic directional control means 30. The pawl means 32 is pivoted about post 31 in the clockwise direction until the pawl tooth 33 thereof engages with the ratchet wheel carried by the rotor of the synchronous motor. The pawl rides down the fall contour of the ratchet until such time as the pawl tooth 33 engages with a tooth of the ratchet wheel 35 fixedly connected to the shaft 21 of the rotor means. As shown in FIG. 2, the surface of the pawl tooth 33 engaging with the tooth of the ratchet wheel is flat, and since the surface of the ratchet wheel tooth engaging with the pawl tooth is also flat, the pawl arm prevents further rotational displacement of the ratchet wheel and hence rotation of the rotor means in the clockwise direction. Since the rotor can no longer be displaced in the clockwise direction, the alternating flux of the coil causes displacement of the rotor means in the direction of arrow 38, or the counterclockwise direction. As described hereinbefore, the permanent magnet 34 carried by the pawl means 32 of the directional control means follows the permanent magnet of the rotor thereby causing the pawl means to pivot about post 23 in the counterclockwise direction as the permanent magnet 23 of the rotor means is displaced in the counterclockwise direction. As shown in FIG. 3, the pawl tooth of the pawl means disengages the ratchet tooth of the ratchet wheel thereby allowing the rotor means to be displaced in the counterclockwise direction without subsequent interference from the pawl means. It will be noted that no lag time results in the displacement of the rotor means during the disengagement of the pawl means from the ratchet wheel due to the fact that the pawl is displaced in the counterclockwise direction by the displacement of the permanent magnet 23 of the rotor and due to the rise contour of the ratchet on which the pawl tooth is riding. The pawl means will continue to be displaced in the counterclockwise direction until a side of the pawl means engages with the stop post 36 formed in the end plate 12. Further arcuate displacement of the pawl means is substantially prevented by the stop post as long as the rotor of the motor is rotating in the counterclockwise direction.

While the invention is illustrated and described in an embodiment, it will be understood that modifications and variations may be effected without departing from the scope of the novel concepts of this invention and as set forth in the appended claims.

Having thus described my invention, I claim:

1. A self-starting synchronous motor comprising a housing including stator poles, a coil, a permanent magnet rotor, said rotor including a cylindrical permanent magnet the opposite faces of which are magnetized of different polarities with respect to each other, a triangular-shaped pawl means including a centrally disposed opening and including a pawl tooth extending into said opening, said pawl means pivotally coupled to said housing, magnet means carried by said pawl means and extending along substantially the length of one side of said triangular-shaped pawl means and including a pole spaced adjacent one of the faces of said cylinder of a polarity opposite the polarity of said face such that said magnet means carried by said triangular-shaped pawl means is urged in the direction of displacement of said rotor means, and a ratchet wheel carried by said rotor means and rotatable within said opening of said triangular-shaped pawl means, rotation of said rotor means in a first direction causing said triangular-shaped pawl means to engage with said ratchet wheel thereby preventing further rotation of said rotor means in said first direction and rotation of said rotor means in a second direction causing said triangular-shaped pawl means to be displaced out of engagement with said ratchet wheel thereby allowing further rotation of said rotor means in said second direction.

2. A self-starting synchronous motor as claimed in claim 1, wherein said magnet means of said pawl means is in spaced parallel relationship with said permanent magnet rotor means.

3. A self-starting synchronous motor as claimed in claim 1, wherein said substantially triangular-shaped pawl means is fabricated from a resilient plastic material to thereby reduce noise generated during the displacement thereof.

References Cited

UNITED STATES PATENTS

| 2,673,939 | 3/1954 | Tetro | 310—41 |
| 3,354,993 | 11/1967 | Vander Lely | 310—41 X |
| 3,307,056 | 2/1967 | Wooley | 310—41 |

FOREIGN PATENTS

| 449,863 | 7/1936 | Great Britain. |
| 662,952 | 12/1951 | Great Britain. |

DONOVAN F. DUGGAN, Primary Examiner

U.S. Cl. X.R.

310—162